(12) United States Patent
Bazargan et al.

(10) Patent No.: US 12,074,534 B2
(45) Date of Patent: Aug. 27, 2024

(54) APPARATUS AND METHODS FOR PROVIDING ELECTRICAL CONVERTER CONTROL PARAMETERS BASED ON THE MINIMISATION OF THE H-INFINITY NORM

(71) Applicant: Power Nova Technology Limited, Coventry West Midlands (GB)

(72) Inventors: Masoud Bazargan, Coventry (GB); Sajjad Fekriasl, Coventry (GB); Sean Kelly, Coventry (GB); Andre Paulo Canelhas, Coventry (GB)

(73) Assignee: Power Nova Technology Limited, Coventry West Midlands (GB)

( * ) Notice: Subject to any disclaimer, the term of this patent is extended or adjusted under 35 U.S.C. 154(b) by 200 days.

(21) Appl. No.: 17/640,252

(22) PCT Filed: Sep. 4, 2020

(86) PCT No.: PCT/GB2020/052128
§ 371 (c)(1),
(2) Date: Mar. 3, 2022

(87) PCT Pub. No.: WO2021/044162
PCT Pub. Date: Mar. 11, 2021

(65) Prior Publication Data
US 2022/0321025 A1    Oct. 6, 2022

(30) Foreign Application Priority Data
Sep. 4, 2019 (GB) .................................... 1912729

(51) Int. Cl.
*H02M 7/483* (2007.01)
*H02M 1/00* (2006.01)

(52) U.S. Cl.
CPC ......... *H02M 7/483* (2013.01); *H02M 1/0012* (2021.05)

(58) Field of Classification Search
CPC ......... H02M 7/483; H02M 1/0012; H02J 3/38
See application file for complete search history.

(56) References Cited

U.S. PATENT DOCUMENTS 6,490,118 B1  12/2002  Ell et al.
9,158,291 B1  10/2015  Gahinet
(Continued)

FOREIGN PATENT DOCUMENTS

CN    103780107 A    5/2014
CN    106301049 A    1/2017
(Continued)

OTHER PUBLICATIONS

PCT International Search Report & Written Opinion of the International Searching Authority; PCT/GB2020/052128; Nov. 27, 2020; 17 pages.
(Continued)

*Primary Examiner* — Kyle J Moody
(74) *Attorney, Agent, or Firm* — Conley Rose, P.C.; J. Robert Brown, Jr.

(57) ABSTRACT

There is provided methods and apparatus configured to provide electrical converter control parameters, the apparatus comprising: a Structured H-infinity tuning module configured to determine one or more control parameters, for a model of an electrical converter control system and grid, based on variation of one or more grid parameters; and an output module configured to provide the one or more control parameters for implementation in the electrical converter control system.

17 Claims, 5 Drawing Sheets

(56) References Cited

U.S. PATENT DOCUMENTS

| | | | | |
|---|---|---|---|---|
| 2015/0070948 A1* | 3/2015 | Johnson | ............... | H02J 3/38 363/40 |
| 2020/0412271 A1* | 12/2020 | Wu | ............ | H02M 7/219 |

FOREIGN PATENT DOCUMENTS

| CN | 107479386 A | 12/2017 |
|---|---|---|
| IN | 110138184 A | 8/2019 |
| WO | 2010086071 A1 | 8/2010 |

OTHER PUBLICATIONS

UK IPO Search & Examination Report; Application No. 1912729.9; Mar. 2, 2020; 7 pages.

Apkarian, P., et al.; "The H∞ Control Problem is Solved"; AerospaceLab Journal; Sep. 2017; 11 pages.

Asrari, Arash, et al.; "Impedance Analysis of Virtual Synchronous Generator-Based Vector Controlled Converters for Weak AC Grid Intergration"; IEEE; 2018; 10 pages.

Hu, Qi, et al.; "Large Signal Synchronizing Instability of PLL-Based VSC Connected to Weak AC Grid"; IEEE; 2018; 10 pages.

Long, Bo, et al.; "Numerator-Dominator Model Based Ho Robust Control for LCL Filter-Based Grid-Connected Inverters Under Weak Grid Conditions"; 2019; 7 pages.

Kahrobaeian, Alireza, et al.; "Suppression of Interaction Dynamics in DG Converter-Based Mircrogrids Via Robust System-Oriented Control Approach"; IEEE; 2012; 12 pages.

Koch, Gustavo Guilherme, et al.; "Robust H∞ State Feedback Controllers Based on Linear Matrix Inequalities Applied to Grid-Connected Converters"; IEEE; 2018; 11 pages.

Egea-Alvarez, Agusti, et al.; "Advacned Vector Control for Voltage Source Converters Connected to Weak Grids"; IEEE; 2015; 10 pages.

Hornik, T., et al.; "H∞ Repetitive Voltage Control of Grid-Connected Inverters with a Frequency Adaptive Mechnism"; IET Power Electron; 2010; 11 pages.

* cited by examiner

Fig. 10

APPARATUS AND METHODS FOR PROVIDING ELECTRICAL CONVERTER CONTROL PARAMETERS BASED ON THE MINIMISATION OF THE H-INFINITY NORM

CROSS-REFERENCE TO RELATED APPLICATIONS

This application is a U.S. National Stage of International Patent Application No. PCT/GB2020/052128 filed Sep. 4, 2020, which claims priority to GB Application No. 1912729.9 filed Sep. 4, 2019, both of which are incorporated by reference herein as if reproduced in their entireties.

FIELD OF THE DISCLOSURE

Embodiments of the present disclosure relate to apparatus and methods for providing electrical converter control parameters. In particular, they relate to apparatus and methods for providing voltage source converter control parameters.

BACKGROUND TO THE DISCLOSURE

Electrical power quality in electrical power grids is expected to decline considerably as generation via low-inertia electrical converters such as voltage source converters (VSCs) increases, while generation via high-inertia electrical converters such as electromechanical converters declines.

VSCs convert DC electrical energy to AC electrical energy. VSCs are widely used for applications such as most renewable power sources, battery storage, motor drives, etc. VSCs are also desirable for electrical transmission using High Voltage Direct Current (HVDC) or Medium Voltage Direct Current (MVDC).

However, VSCs lack a rotating inertia for smoothing fluctuations in voltage and frequency, and their controllers rely on the assumption that synchronous generators (high-inertia energy sources) will remain the dominant source of generation in the electrical grid. This will cease to be the case in many countries over the coming years. Power stations with synchronous generators powered by coal, gas and nuclear energy are rapidly closing down and not being renewed, due to concerns and limits regarding emissions, safety, and energy security.

When electrical grids become dominated by VSCs or similar low-inertia sources, a trend which can be exacerbated by the fact that new generation sources are often located in remote areas (e.g. off-shore sites), these grids will be regarded as 'weak grids', meaning that small changes in injected currents can cause large changes in grid voltage. Such weak grids are also described as having a low short circuit ratio (SCR). On such weak grids voltage can become highly coupled to active power and the risk of voltage instability following credible network disturbances, like overhead line faults, increases. This is expected to lead to widespread brown-outs, black-outs, and/or damage to sensitive equipment.

The challenge is further worsened by changing demand characteristics, such as the transition from internal combustion to electric transport, population increases, and the temporal unpredictability of renewable energy availability.

BRIEF DESCRIPTION OF VARIOUS EMBODIMENTS OF THE DISCLOSURE

The present disclosure addresses, at least in part, the above challenges, by providing improved control parameters for an electrical converter (e.g. VSC), to improve grid stability.

The scope of protection of the disclosure is set out by the appended independent claims.

According to various, but not necessarily all, embodiments there is provided an apparatus configured to provide electrical converter control parameters, the apparatus comprising:

a Structured H-infinity tuning module configured to determine one or more control parameters, for a model of an electrical converter control system and grid, based on variation of one or more grid parameters; and an output module configured to provide the one or more control parameters for implementation in the electrical converter control system.

H-infinity based design techniques are sophisticated methods of synthesizing and tuning controllers for high performance and stability, by defining an optimization problem that describes the desired performance of the controller, and then by finding a controller design that solves the optimization problem. The optimization problem is structured so that maximum controller performance can be found through minimising the 'H-infinity norm' of the system dynamics, i.e. the peak gain or the largest value of the system frequency response magnitude is minimised.

An advantage of the above apparatus is that the Structured H-infinity tuning module implements parametrically robust Structured H-infinity control. This enables the Structured H-infinity tuning module to find optimum control settings that work even in the 'worst-case' grid condition. The user does not need to specify what the worst-case combination of grid parameters is; they need only specify the ranges within which these parameters can vary.

In some, but not necessarily all examples, the one or more control parameters are constant values with respect to at least electrical power variation. An advantage is achieving a stable grid with a minimum number of controllers. Previous attempts considered gain scheduling controllers that may result in hundreds of controller gains, each corresponding to a different operating point (e.g. electrical power), together with the need for additional scheduling supervisory systems. Controllers designed according to these previous attempts were difficult to design, and were unstable if implemented in real grids subject to real-life fast-changing grid parameters. Progress had therefore stalled for several years until the approach described herein was devised.

In some, but not necessarily all, examples, the Structured H-infinity tuning module is configured to minimise the H-infinity norm in the circumstances where stability performance is worst (i.e. the set of tuneable controller parameters are adjusted so as to give the optimum H-infinity norm for operation across all possible combinations of grid parameters within the defined numerical ranges identified for the grid parameters). Therefore, in some, but not necessarily all, examples, the Structured H-infinity tuning model is configured to determine optimum control system performance by minimising an H-infinity norm, based on allowed variation of one or more grid parameters within one or more ranges. The model of the grid may comprise ranges of allowable variation of the grid parameters. The endpoints of the ranges are based on scenarios that may occur in operation. Varying the grid parameters may result in varying the grid Thevenin equivalent (both impedance and voltage). An advantage is that the control parameters can be optimised based on performance weights and variation of grid parameters, to optimise around the worst-case scenario.

In some, but not necessarily all examples, the one or more grid parameters comprise grid voltage and/or grid inductance and/or grid capacitance and/or grid resistance and/or grid impedance and/or power. An advantage is a more stable grid, because the controller is guaranteed to be robust against the parameter variations that cause instability.

In some, but not necessarily all examples, the one or more control parameters are determined based on automatic variation of a plurality of the grid parameters. An advantage is a grid with improved stability, because grid sensitivity/stability is a multivariate problem.

The above approach is distinct from an alternative approach of individually tuning a plurality of models, each model corresponding to a particular operating point of one grid parameter (e.g. electrical power). Such an approach would require a very large set of feedback controllers to be determined, each set of control parameters corresponding to a particular measured operating point. A supervisory controller would be needed for selecting appropriate control parameters based on measured network conditions. Many of the parameters of the grid may not be directly measurable, and controllers may be fundamentally unable to respond in a stable manner to very fast disturbances that may be encountered in real life. Therefore, the approaches disclosed herein provide a substantial improvement in stability against fast and unexpected changes in conditions.

In some, but not necessarily all examples, the one or more control parameters comprise gains that allow measured voltage variations to affect a power control loop, and/or gains which allow measured power variations to affect a voltage control loop, controller proportional gains, and/or controller integrator gains, and/or controller derivative gains.

The gains that allow voltage variations to affect to the power control loop (and vice versa) are also referred to as "decoupling gains" because by correct selection of these gains it is possible to counteract somewhat the coupling between power and voltage that can occur on weak grids.

In some, but not necessarily all examples, the electrical converter control system comprises a cascade control system comprising inner loop control and outer loop control, and wherein the one or more control parameters are outer loop control parameters. An advantage is that the potential instability of the outer loop controller is reduced. In some, but not necessarily all, examples it may be beneficial to change inner loop or PLL parameters to take advantage of the greater flexibility allowed by having outer loop control parameters that are optimised using Structured H-Infinity.

In some, but not necessarily all examples, the electrical converter control system implements a Vector Control scheme. In some examples, the electrical converter is a voltage source converter. An advantage is that the potential instability of this voltage source converters in weak grids is reduced.

In some, but not necessarily all examples, the apparatus comprises: at least one processor; and at least one memory including computer program code; the at least one memory and the computer program code configured to, with the at least one processor, implement the Structured H-infinity tuning module, and the output module.

According to various, but not necessarily all, embodiments there is provided an electrical converter for an electrical power grid, wherein the electrical converter comprises an electrical converter control system, and wherein the electrical converter control system comprises one or more of the control parameters determined by the apparatus. An advantage is that the electrical converter can be optimised to improve stability.

In some, but not necessarily all examples, the electrical converter control system is configured to receive an indication of frequency of the electrical power grid, and configured to provide the indication of the frequency as a feedforward parameter to a phase-locked loop control block of the electrical converter control system. An advantage is that the stability is further enhanced, because the feedforward path can help reduce tracking error and settling time associated with a changing grid frequency. This is of particular importance on a system with low inertia where rapid changes in grid frequency may occur at the same time as situations that create a risk of voltage instability.

According to various, but not necessarily all, embodiments there is provided a computer program configured to provide electrical converter control parameters, that, when executed, provides:

a Structured H-infinity tuning module configured to determine one or more control parameters, for a model of an electrical converter control system and grid, based on variation of one or more grid parameters; and an output module configured to provide the one or more control parameters for implementation in the electrical converter control system.

According to various, but not necessarily all, embodiments there is provided a non-transitory computer readable medium comprising computer readable instructions that, when executed by a processor, cause performance of any one or more of the methods described herein.

According to various, but not necessarily all, embodiments there is provided a computer-implemented method configured to provide electrical converter control parameters, the method comprising:

determining, using a Structured H-infinity tuning module, one or more control parameters, for a model of an electrical converter control system and grid, based on variation of one or more grid parameters; and providing output of the one or more control parameters for implementation in the electrical converter control system. The method may comprise implementing the one or more control parameters in the electrical converter control system.

BRIEF DESCRIPTION OF THE DRAWINGS

For a better understanding of various examples of embodiments of the present disclosure reference will now be made by way of example only to the accompanying drawings in which.

DETAILED DESCRIPTION OF VARIOUS EMBODIMENTS OF THE DISCLOSURE

Figure 1A:
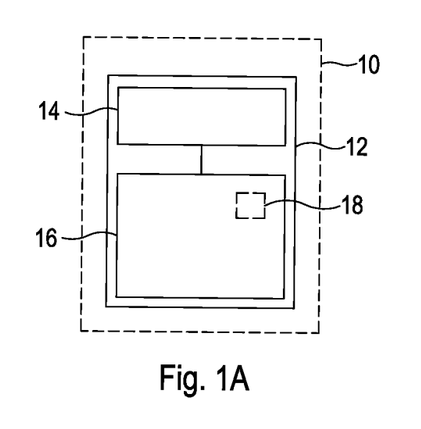
FIG. 1A illustrates an example of an apparatus.

FIG. 1A illustrates apparatus 10 configured to implement the disclosure. The apparatus 10 may comprise a computer, or a module thereof such as a chipset. In the illustration, the apparatus 10 comprises one chipset 12. In other examples, the functionality of the apparatus 10 is distributed over a plurality of computers and/or chipsets 12.

The chipset 12 of FIG. 1A includes at least one processor 14; and at least one memory 16 electrically coupled to the processor 14 and having instructions 18 (e.g. a computer program) stored therein, the at least one memory 14 and the instructions 18 configured to, with the at least one processor 14, cause any one or more of the methods described herein to be performed.

Figure 1B:
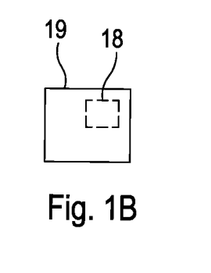
FIG. 1B illustrates an example of a non-transitory computer-readable storage medium.

FIG. 1B illustrates a non-transitory computer-readable storage medium 19 comprising the instructions 18 (computer software).

Figure 2:
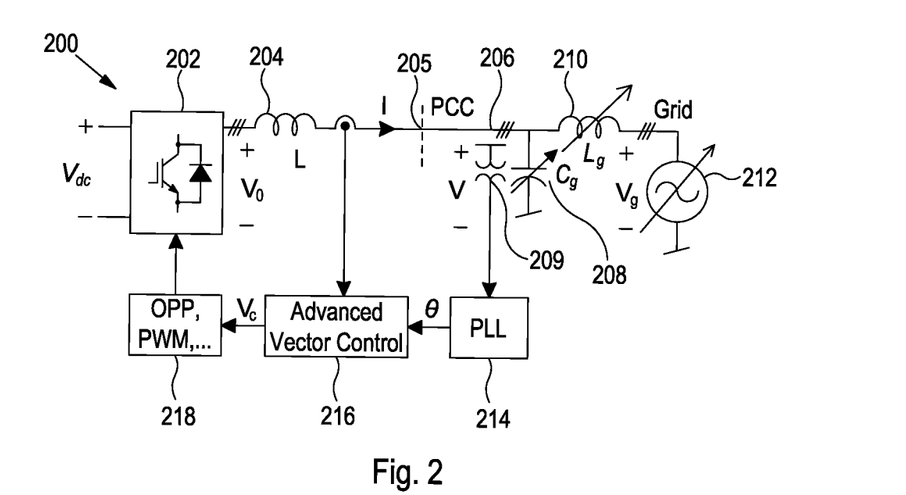
FIG. 2 illustrates an example topology representation of a model of a network.

FIG. 2 illustrates a topological model 200 of an electrical grid network. The network comprises an electrical converter 202. The network comprises one or more optional coupling filter components 204 coupled to the output of the electrical converter 202. An electrical grid is coupled to the output of the filter components 204 at a point of common coupling (PCC) 205.

In FIG. 2, but not necessarily in all examples, the electrical converter 202 is a VSC. The illustrated VSC comprises a diode clamped multilevel inverter, receiving a DC supply voltage Vdc and outputting an output voltage Vo.

The coupling filter components are for smoothing the output of the electrical converter 202. The illustrated filter components 204 comprise an inductor 204 having an inductance L. The filter components may comprise a resistor (not shown). The filter components may comprise a capacitor (not shown).

The example electrical grid is represented by an inductance Lg 210, a grid voltage Vg 212, and a capacitance Cg 208. Grid resistance Rg/impedance Zg are not shown but could be modelled.

It would be appreciated that the example network may be other than described above, depending on the site-specific implementation of the electrical grid.

The electrical converter 202 is controlled by one or more electrical converter controllers (controllers' herein) defining a control system, for controlling the output of the electrical converter 202 to the electrical grid. The controllers may synchronise the output of the electrical converter 202 to the electrical grid.

In FIG. 2, the illustrated control system implements a voltage tracking/synthesis block 214, for example a phase locked loop (PLL). The PLL is a high-level control block which measures the voltage angle of the electrical grid at or downstream of the PCC 205, optionally via the illustrated voltage transformer 209. The PLL 214 determines a voltage angle θ for ensuring the AC output Vo is at substantially the same frequency and phase as the grid frequency. The PLL 214 may be implemented using one or more PI/PID controllers.

The control system illustrated in FIG. 2 also comprises an advanced vector control block (AVC) 216 comprising control parameters according to an aspect of the disclosure. The AVC control block 216 may have a fixed structure. The control system also comprises a modulation control block 218. These control blocks are described below with reference to FIG. 3.

Figure 3:
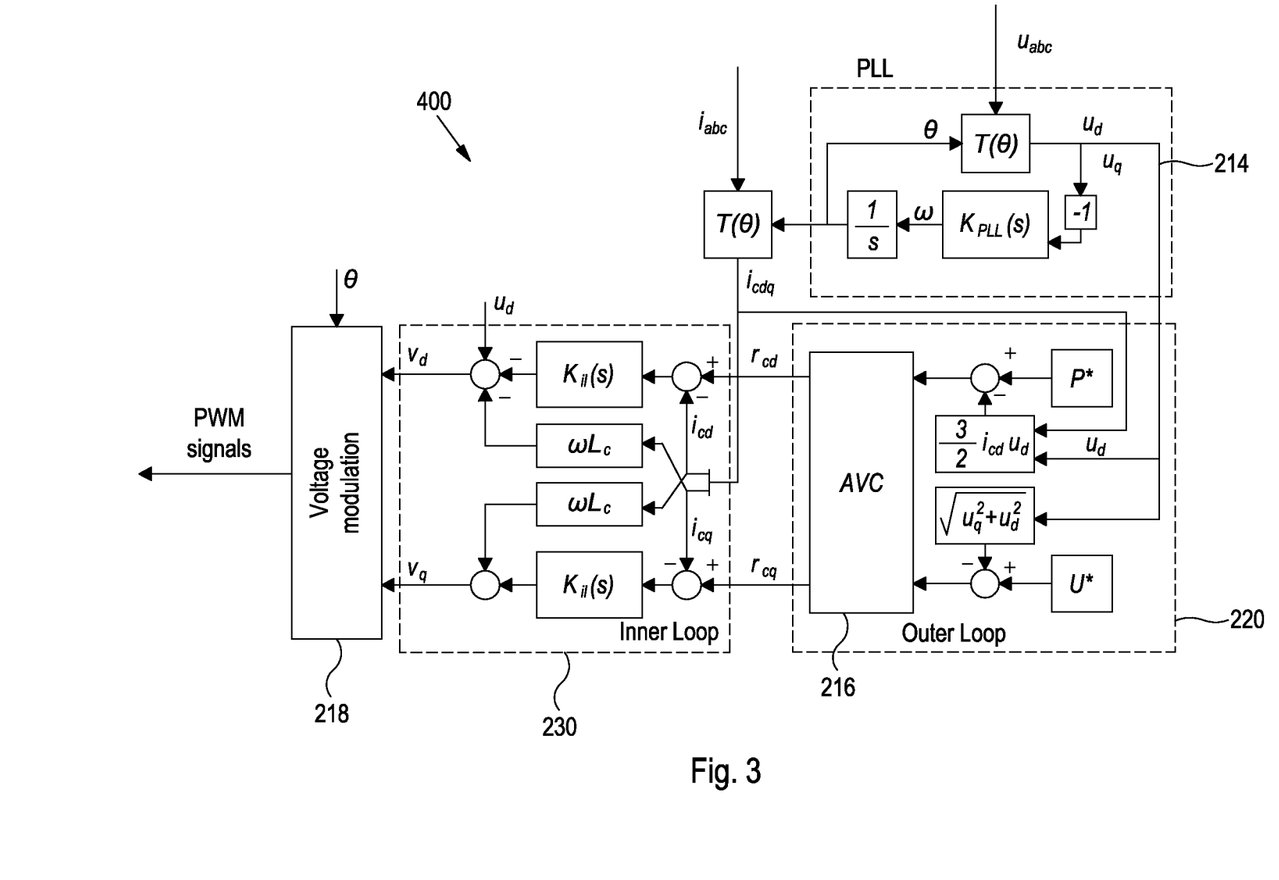
FIG. 3 illustrates an example control system for an electrical converter.

FIG. 3 illustrates an example control system 400 comprising the control blocks 214, 216 and 218 implemented by the one or more controllers, and additional detail. The control system 400 uses cascade control and comprises inner and outer loops. FIG. 3 illustrates the PLL 214, an outer loop control block 220 implementing the AVC 216, an inner loop control block 230, and the modulation control block 218. The illustrated PLL and inner loop structure and terminology would be familiar to a person skilled in the art.

The illustrated control system 400 is a Vector Control system (also referred to as Field Oriented Control) because control is based on two independent current components (q-axis and d-axis) in the synchronous reference frame, provided by the PLL 214. Vector Control systems are known in the art.

The terminology is as follows. Voltages are denoted by 'u' or 'v'. Power is denoted by 'P'. Current is denoted by 'i'. The superscript '*' denotes a setpoint. The 'c' subscript denotes a measurement at the PCC 205 or between the inverter 202 and the PCC 205. The 'd' subscript represents the d-axis in a dq reference frame (Vector control). The 'q' subscript represents the q-axis in the dq reference frame. The 'abc' subscript is three-phase nomenclature. The term 's' denotes the complex s-plane for frequency-domain functions. The term 'ω' expresses frequency. The term 'θ' denotes angle. The function '(θ)' denotes the Park transformation. The term 'K(s)' denotes a controller such as a PI/PID controller.

The illustrated outer loop control block 220 is configured to regulate the active power and voltage at the PCC 205. Power and voltage error terms are calculated and input to AVC block 216 controllers. The AVC block 216 comprises separate d-axis and q-axis PI/PID controllers. The controller outputs provide d-axis and q-axis current setpoints for lower-level control. In some examples, the controllers comprise a power control loop configured to calculate the d-axis current setpoint based on the power error term relative to a power setpoint, and a voltage control loop configured to calculate the q-axis current setpoint based on the voltage error term relative to a voltage setpoint.

The inner loop control block 230 is a low-level control block configured to regulate the current through the coupling filter components 204, based on the current setpoints provided by the outer loop control block 220. Error terms of current are calculated and input to PI/PID controllers. The controller outputs provide d-axis and q-axis voltages. The output voltages may be subtracted from the calculated voltage across the inductor Lc/L, and in the d-axis at least the result may be further subtracted from d-axis voltage measured at the PCC 205.

The modulation control block 218 may control voltage modulation based on θ and based on the d & q axis voltage outputs of the inner loop control block 230. The modulation control block 218 may comprise a pulse-width modulator (PWM). In some, but not necessarily in all examples, an OPP-PWM (optimal pulse pattern PWM) scheme is used to implement the modulation control block 218. The modulation control block 218 outputs gate signals for the inverter 202. The gate signals may be PWM gate signals, for causing the inverter 202 to output a grid-synchronised AC voltage.

The control methodology may differ from that shown in FIGS. 2-3. For example, a different vector control methodology could be used. Controllers other than PI/PID controllers could be used. Error terms could be calculated differently.

In FIG. 3, but not necessarily in all examples, the AVC block 216 is implemented as part of the outer loop control block 220, and the AVC block 216 comprises control parameters determined according to an aspect of the disclosure.

Figure 4:
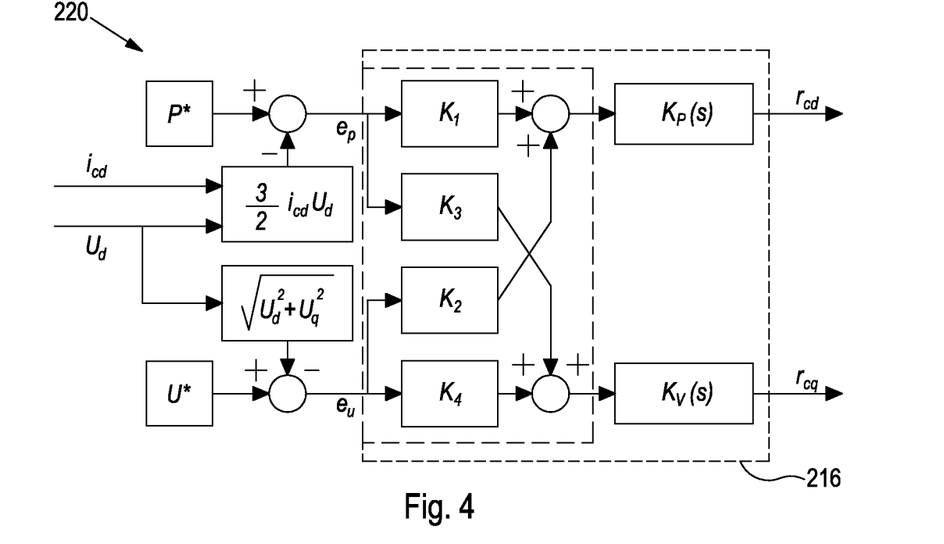
FIG. 4 illustrates an example of control parameters for an electrical converter control system.

FIG. 4 illustrates the AVC block 216 in a specific example, wherein the AVC block 216 comprises a set of control parameters k1, k2, k3, k4 and the set of outer loop PI/PID controllers that output current setpoints ($r_{cd}$, $r_{cq}$) to the inner loop.

The AVC block 216 of FIG. 4 comprises a power control loop and a voltage control loop. The power control loop comprises a power controller Kp(s) for calculating a d-axis current setpoint rcd based on a power error term $e_p$. The power error term is relative to a power setpoint P*. The voltage control loop comprises a voltage controller Kv(s) for calculating a q-axis current setpoint rcq based on a voltage error term $e_u$. The voltage error term is relative to a voltage setpoint U.

In the AVC block 216 of FIG. 4, the control parameters k1-k4 comprise gain k2 that allows measured voltage variations to affect the power control loop, and gain k3 that allows measured power variations to affect the voltage control loop. These 'decoupling' gains k2-k3 are useful because the outer loop control block 220 can become unstable in weak grids where voltage and power can become undesirably coupled.

The gains k1-k2 modify the power error term $e_p$ provided to the power controller Kp(s), wherein. The gains k3-k4 modify the voltage error term $e_u$ provided to the voltage controller Ku(s). With suitably chosen parameters the gains k2 and k3 can help to cancel out the undesirable coupling introduced by weak grids.

The power controller Kp(s) receives the following power error term:

$$k_1 e_p + k_2 e_u$$

The voltage controller Ku(s) receives the following voltage error term:

$$k_3 e_p + k_4 e_u$$

The gains k1 and k4 could be optionally omitted because the power and voltage controllers may comprise their own proportional gains.

The gains may be fixed for substantial variation of at least one variable. For example, the gains may be (substantially) fixed values with respect to at least electrical power variation. In the specific example of FIG. 4, the gains k1-k4 are static and not a function of any variable. Therefore, the outer loop control block 220 does not require multiple controllers for different operating points, or a supervisory controller for selecting the appropriate controller.

Figure 5:
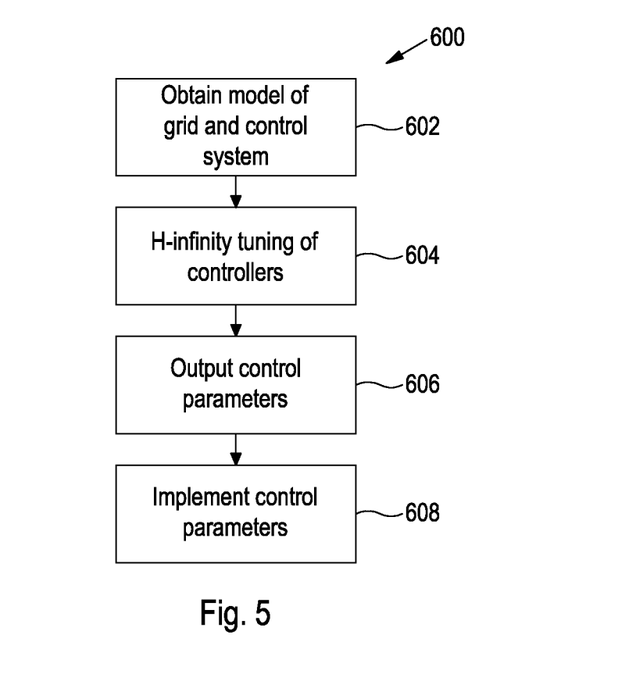
FIG. 5 illustrates an example of a method.

In order to ensure that the control parameters (e.g. gains k1-k4 and/or outer loop PI/PID gains) provide robust stability, a method 600 is illustrated in FIG. 5. The method 600 may be implemented by the apparatus and computer program of FIGS. 1A and 1B.

The method 600 comprises, at block 602, obtaining a model of the control system 400 and of the grid as seen by the control system 400. The obtained model of the grid comprises one or more of the following grid parameters: grid voltage Vg, grid inductance Lg, grid capacitance Cg, grid resistance/impedance Rg/Zg, power P, and/or the like.

The grid parameters may be variables. One or more of the grid parameters may be allowed to vary within a respective range. Different variables may be configured to vary within different ranges. The model may define the ranges over which the grid parameters are allowed to vary.

The one or more ranges may define ranges of expected in-service values of the grid parameters, such as zero to full load of electrical power, wherein 'full-load' is site-specific. The ranges may be ranges that are expected to be seen/measured at the intended location of the control system 400 in the grid. The ranges may be defined via estimation and/or simulation and/or provided by an infrastructure manager.

At block 604, the method 600 comprises determining (e.g. tuning), using a Structured H-infinity tuning module, one or more control parameters for the model of the electrical converter control system 400.

An example of a suitable Structured H-infinity tuning technique is summarised in P. Apkarian, D. Noll. The H∞ Control Problem is Solved. AerospaceLab Journal, ONERA, 2017, p. 1-11. The variant of H-infinity that ensures that the solution is robust against variation in grid parameters is described on page 8, in FIG. 6, and on page 10 of Apkarian's paper ('Parametric robust H-infinity control').

When the Structured H-infinity tuning module is run, the Structured H-infinity tuning module obtains the model of the control system and grid (plant) including the range(s) of the grid parameter(s). The Structured H-infinity tuning module then automatically (without user intervention) varies the grid parameters iteratively within the respective allowable site-specific ranges, as part of solving the optimization problem.

Once the set of control parameters is found that solves the optimization problem (minimizes the H-infinity norm), the set of control parameters is output at block 606. By allowing the Structured H-infinity tuning module to vary the grid parameters within the respective ranges, the single set of control parameters output from solving the optimization problem provides a controller that gives the best performance possible, and in particular should remain stable in any 'worst-case' scenario that may be encountered in operation, as long as the parameter ranges input to the Structured H-infinity tuning module are realistic and do not exceed the inherent capabilities of the control system design selected.

At blocks 606 and 608, the method 600 comprises providing output (block 606) of the one or more control parameters for implementation (block 608) in the electrical converter control system 400.

Once the control parameters are implemented in into a control system 400 substantially similar to that which was modelled, for a grid substantially as described in the model, then the control system 400 will exhibit improved stability and responsiveness in-service.

The above method 600 is part of a design and manufacture process for the electrical converter. Implementation of the control parameters in the control system 400 may be performed fully automatically or via automatically providing the output (block 606) to an operator (e.g. engineer) via an output device (e.g. display), directing them to implement the control parameters.

Figure 7:
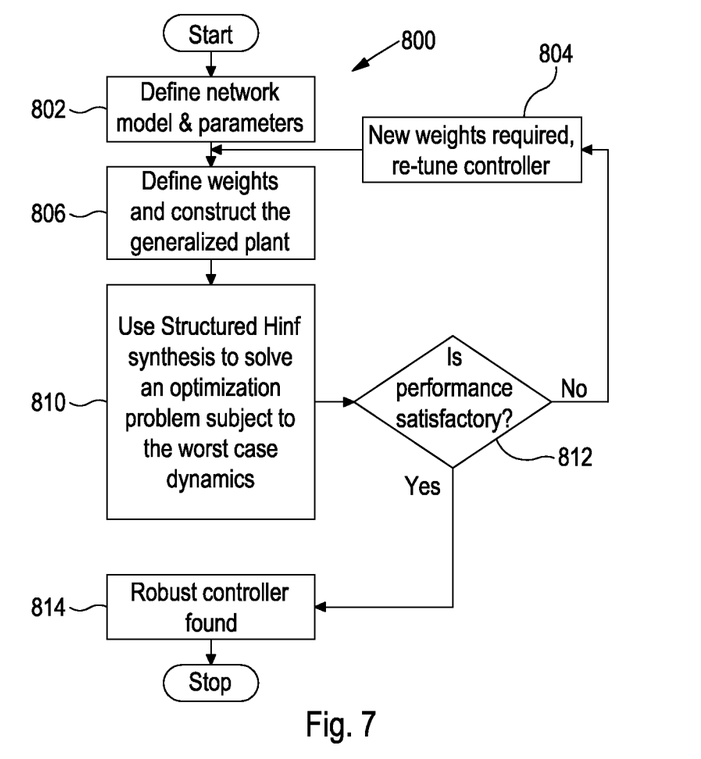
FIG. 7 illustrates an example of a method.

FIG. 7 defines a method 800 according to an example implementation of the method 600 of FIG. 5.

Blocks 802 and 806 comprise obtaining the model for the Structured H-infinity tuning module, like block 602 of the method 600.

At block 802, the network model and grid parameters are defined.

An example of a network model is based on the model 200 shown in FIG. 2 implemented as a simulation. The network model may comprise some or all of the elements shown in the network model 200 of FIG. 2, or more elements, because the network model 200 is site-specific.

Examples of definable grid parameters include, for example, grid parameter values for the provided elements of the model 200 shown in FIG. 2 (e.g. Vg, Lg, Cg, Rg/Zg, etc). Any grid parameters other than voltage, frequency and current at/before the PCC 205 are likely to be unmeasurable by the control system 400 in-service, but measurable and controllable in the model 200.

Some or all of the definable grid parameters are variables. In FIG. 2, the grid voltage Vg 212 and grid inductance Lg 210 and grid capacitance Cg 208 are variables, as illustrated by arrows.

Figure 6:
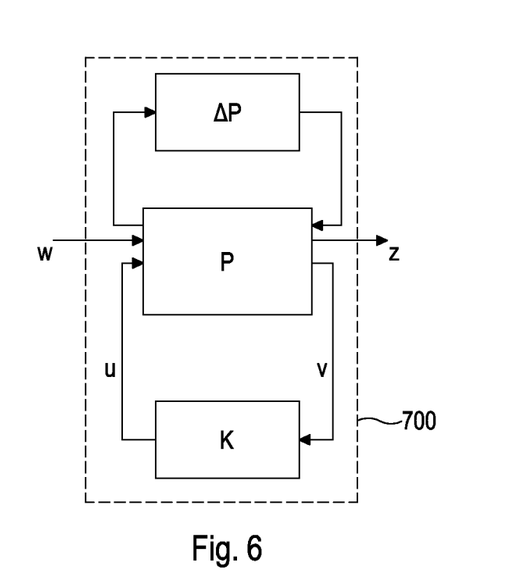
FIG. 6 illustrates an example of a generalized plant for tuning by a Structured H-infinity tuning module.

Block 806 comprises defining performance weights and constructing a generalized system, for example describable in the form of system 700 shown in FIG. 6, for the Structured H-infinity tuning module. The system 700 may comprise a generalized plant P controlled by the control system 400 of FIGS. 3-4, for example. The system 700 may be user-defined. The model of the grid parameters (ranges of the variables) are also provided. The constructed system 700 and the ranges of grid parameters together define the model used by the Structured H-infinity tuning module.

The generalized system 700 may comprise a generalized state space model describing a weighted closed loop transfer function of the control system 400. The tunable control parameters (e.g. gains k1-k4) are defined within this.

The Structured H-infinity tuning module is configured to adjust the tunable control parameters to minimise the H-infinity norm of the weighted transfer function. For example, a minmax function may be employed, wherein the Structured H-infinity tuning module automatically finds the maximum H-infinity norm across a plurality of (e.g. all) possible grid parameters, and then finds the set of tunable control parameters that minimises this maxima. This parametrically robust Structured H-infinity approach provides robustness against modelled uncertainty.

Referring to FIG. 6 in more detail, element 700 comprises blocks P, ΔP and K. Fixed plant P includes within it both the converter's power components and the grid to which the converter is connected. The fixed plant P may be defined as a numeric linear time variant (LTI) model/matrix. The plant P may approximate a plurality of the grid elements 202, 204, 208, 209, 210, 212 of the model 200 of FIG. 2. Additionally, the block ΔP in FIG. 6 represents all of the uncertainty in the parameters of the plant, for instance the potential variation of the grid parameters within allowed ranges.

The block K represents one or more tunable components which form a controller for the converter. The K-block may contain one or more of the control elements 214, 216, 218 of FIGS. 2-4. The K-block may contain k1-k4 as a matrix of gains.

The performance weights are additional components within the models of plant (P) and control system (K) which allow the quality of the control system's performance to be quantified. Desirable control system characteristics that can be measured through these performance weights include (but are not limited to) accuracy of following setpoint changes, stability and sensor noise rejection.

Block 810 of the method 800 comprises determining, using the Structured H-infinity tuning module, the one or more control parameters for the electrical converter control system 400 that solves the optimization problem (results in the minimal H-infinity norm), based on the generalized system 700 with certain parameters within that plant being allowed to vary over defined ranges, with adverse combinations of these variable parameters combining to create worst-case conditions. This is achieved by automatically varying the grid parameters within their ranges when solving the optimization problem (block 810).

Figure 8:
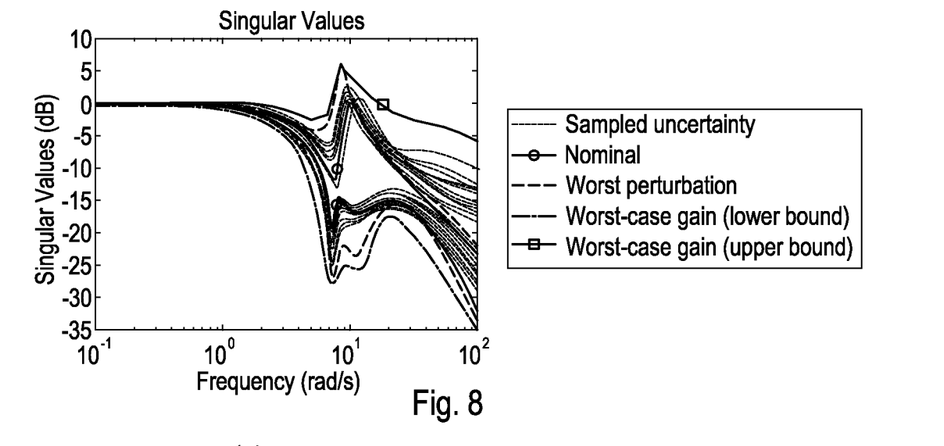
FIG. 8 is a graph illustrating an example of a frequency response curve of the network of FIG. 2.

FIG. 8 is a graph of the frequency response of a simulated grid model with different values of grid parameters, plotting nominal and worst-case results. The frequency response represents how much the grid amplifies or attenuates certain frequencies, that may be seen at the PCC 205. FIG. 8 illustrates that at different frequencies, attenuation may be very low or very high. The upper- and lower-bound worst-case dynamics define a maximum envelope of the possible frequency responses of the model 200. The Structured H-infinity tuning module finds optimal control parameters within the space bounded by the upper and lower bounds.

Figure 9:
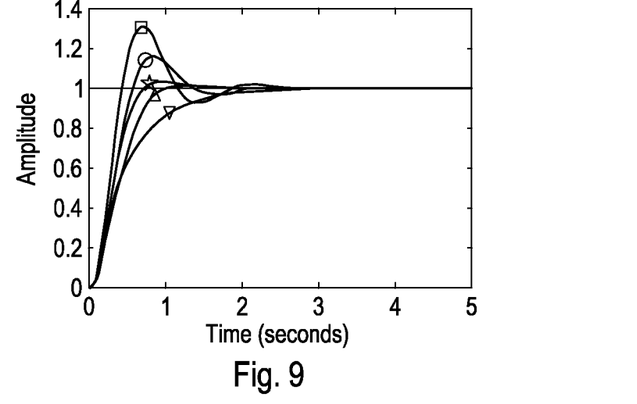
FIG. 9 is a graph illustrating the effect of control parameters on settling time.

FIG. 9 is a graph illustrating time-domain responses of the control system 400 with different control parameters. The line comprising a star-shaped marker defines optimal control parameters computed by the Structured H-infinity tuning module. The other lines with non-star-shaped markers represent underdamped and overdamped control parameters.

Figure 10:
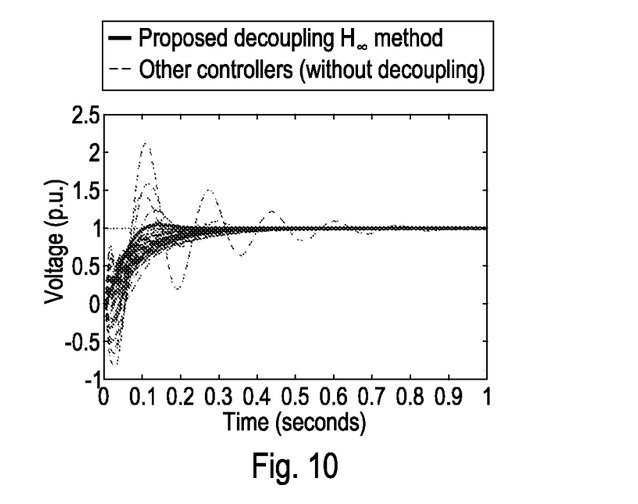
FIG. 10 is a graph illustrating the effect of different control approaches on settling time.

FIG. 10 is a graph illustrating a time-domain response of the control system 400 performing optimally, with gains k1-k4 determined using the Structured H-Infinity Tuning Module described herein. Time-domain responses using other control approaches are shown, those approaches lacking an AVC control block 216, and not relying on optimised gains k1-k4.

Referring back to the method 800 of FIG. 7, block 812 comprises manually (or automatically) determining whether the control parameters of block 810 define a sufficiently robust controller, for example based on time/frequency domain performance. Some definitions of good performance may in some cases be set by standards, such as the Security and Quality of Supply Standards (SQSS) industry standard in the United Kingdom.

If the performance is satisfactory, a robust controller has been found (block 814) and the method terminates. If not, the controller is not accepted (block 804) and the method may optionally loop back to an operator redesigning the control system topology at block 806 (e.g. amend the performance weights), and/or changing the ranges in block 802.

It would be appreciated that some, but not necessarily all features of the method 800 of FIG. 7 may be implemented in the method 600 of FIG. 5.

A control system 400 designed according to the above-described methods 600 and/or 800 means that other control blocks of the control system 400 can be optimised for more responsiveness as the control system 400 is more stable overall. An example of optimising other control blocks is described below.

The PLL 214 in a control system 400 without the control parameters can be sensitive to sudden changes in voltage phase (e.g. due to a fault) in weak grids. A fast PLL 214 on a weak grid can create a positive feedback loop. Therefore, although fast PLLs are desirable for low-inertia grids (due to fast frequency changes), PLLs 214 may have to be tuned for stability. The above methods 600 and 800 now enable the PLL 214 to be tuned for compatibility with weak grids without causing instability due to transient increases in voltage vector angle measurement error following grid faults.

As a further example, the PLL 214 may be modified to receive a feedforward indication of grid frequency in order to ensure that the phase θ calculated by the PLL 214 remains sufficiently accurate when frequency is changing rapidly despite the PLL having been optimised for grid stability.

As used here 'module' refers to a unit or apparatus that excludes certain parts/components that would be added by an end manufacturer or a user. A 'control block' refers to a function that can be implemented by a controller or apparatus.

The one or more controllers and/or control systems described herein may be implemented using hardware alone, or software alone, or a combination of hardware and software. FIG. 1A illustrates apparatus for implementing the functionality of the controllers.

The blocks illustrated in the FIGS. 3 to 5 and 7 may represent steps in a method and/or sections of code in the computer program. The illustration of a particular order to the blocks does not necessarily imply that there is a required or preferred order for the blocks and the order and arrangement of the block may be varied. Furthermore, it may be possible for some steps to be omitted.

Although embodiments of the present disclosure have been described in the preceding paragraphs with reference to various examples, it should be appreciated that modifications to the examples given can be made without departing from the scope of the disclosure as claimed. For example, the control parameters could be integrator gains or derivative gains. The control parameters may or may not be gains k1-k4. The methods 600 and 800 may be adapted to different electric converter control systems.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavouring in the foregoing specification to draw attention to those features of the disclosure believed to be of particular importance it should be understood that the Applicant claims protection in respect of any patentable feature or combination of features hereinbefore referred to and/or shown in the drawings whether or not particular emphasis has been placed thereon.

The invention claimed is:

1. An apparatus configured to provide electrical converter control parameters, the apparatus comprising at least one processor; and at least one memory including computer program code; the at least one memory and the computer program code configured to, with the at least one processor, implement:
a structured H-infinity tuning module configured to determine one or more control parameters, for a model of an electrical converter control system and grid, based on variation of grid parameters, wherein the Structured H-infinity tuning module is configured to determine optimum control system performance by minimising an H-infinity norm, based on controlled variation of the grid parameters within ranges, wherein each range is a user-predetermined range for a corresponding one of the grid parameters, wherein the ranges are numerical ranges which specify allowable variation of the grid parameters and comprise endpoints between which the Structured H-infinity tuning module is operable to automatically vary the grid parameters; and
an output module configured to provide the one or more control parameters for implementation in the electrical converter control system.

2. The apparatus of claim 1, wherein the one or more control parameters are constant values with respect to at least electrical power variation.

3. The apparatus of claim 1, wherein the grid parameters comprise at least two of: grid voltage; grid inductance; grid capacitance; grid resistance; grid impedance; or power.

4. The apparatus of claim 1, wherein the one or more control parameters are determined based on automatic variation of a plurality of grid parameters.

5. The apparatus of claim 1, wherein the one or more control parameters comprise gains that allow at least one of: allowing measured voltage variations to affect a power control loop; or allowing measured power variations to affect a voltage control loop.

6. The apparatus of claim 1, wherein the electrical converter control system comprises a cascade control system comprising inner loop control and outer loop control, and wherein the one or more control parameters are outer loop control parameters.

7. The apparatus of claim 1, wherein the electrical converter control system implements a Vector Control scheme.

8. The apparatus of claim 1, wherein the electrical converter control system is a voltage source converter control system.

9. An electrical converter for an electrical power grid, wherein the electrical converter comprises an electrical converter control system, and wherein the electrical converter control system comprises one or more of the control parameters determined by the apparatus of claim 1.

10. The electrical converter of claim 9, wherein the electrical converter control system is configured to receive an indication of frequency of the electrical power grid, and configured to provide the indication of the frequency as a feedforward parameter to a phase-locked loop control block of the electrical converter control system.

11. The apparatus of claim 1, wherein the grid parameters comprise grid impedance, wherein the Structured H-infinity tuning module comprises a minmax function, wherein the Structured H-infinity tuning module is configured to automatically find a maximum H-infinity norm across a plurality of possible grid parameters of the grid parameters within the ranges, and find a set of control parameters that minimise the maximum H-infinity norm.

12. A computer-implemented method configured to provide electrical converter control parameters, the method comprising:
determining, using a Structured H-infinity tuning module, one or more control parameters for a model of an electrical converter control system and grid, based on variation of grid parameters, wherein the Structured H-infinity tuning module is configured to determine optimum control system performance by minimising an H-infinity norm, based on controlled variation of the grid parameters within ranges, wherein each range is a user-predetermined range for a corresponding one of the grid parameters, wherein the ranges are numerical ranges which specify allowable variation of the grid parameters and comprise endpoints between which the Structured H-infinity tuning module is operable to vary the grid parameters; and
providing output of the one or more control parameters for implementation in the electrical converter control system.

13. The method of claim 12, wherein the grid parameters comprise grid impedance, wherein the Structured H-infinity tuning module comprises a minmax function, wherein the Structured H-infinity tuning module is configured to automatically find a maximum H-infinity norm across a plurality of possible grid parameters of the grid parameters within the ranges, and find a set of control parameters that minimise the maximum H-infinity norm.

14. The method of claim 12, wherein the one or more control parameters are constant values with respect to at least electrical power variation.

15. The method of claim 12:
wherein the grid parameters comprise at least two of: grid voltage; grid inductance; grid capacitance; grid resistance; grid impedance; or power.

16. The method of claim 12, wherein the one or more control parameters comprise gains that allow at least one of: allowing measured voltage variations to affect a power control loop; or allowing measured power variations to affect a voltage control loop.

17. The method of claim 12, wherein the electrical converter control system comprises a cascade control system comprising inner loop control and outer loop control, and wherein the one or more control parameters are outer loop control parameters.

* * * * *